(12) United States Patent
Wang et al.

(10) Patent No.: US 9,907,301 B2
(45) Date of Patent: Mar. 6, 2018

(54) DEVICE AND METHOD FOR PRODUCING QUANTITATIVE-DIAMETER SPRAY DROPLETS OF PESTICIDE

(71) Applicant: Beijing Research Center for Information Technology in Agriculture, Beijing (CN)

(72) Inventors: Xiu Wang, Beijing (CN); Wei Ma, Beijing (CN); Wei Zou, Beijing (CN); Zhiqiang Zhang, Beijing (CN); Songlin Wang, Beijing (CN); Rui Zhang, Beijing (CN)

(73) Assignee: BEIJING RESEARCH CENTER FOR INFORMATION TECHNOLOGY IN AGRICULTURE, Beijing (CN)

( * ) Notice: Subject to any disclaimer, the term of this patent is extended or adjusted under 35 U.S.C. 154(b) by 0 days.

(21) Appl. No.: 14/387,154

(22) PCT Filed: Sep. 25, 2013

(86) PCT No.: PCT/CN2013/084161
§ 371 (c)(1),
(2) Date: Sep. 22, 2014

(87) PCT Pub. No.: WO2015/035672
PCT Pub. Date: Mar. 19, 2015

(65) Prior Publication Data
US 2016/0242404 A1    Aug. 25, 2016

(30) Foreign Application Priority Data
Sep. 12, 2013   (CN) .......................... 2013 1 0415264

(51) Int. Cl.
*B05B 1/02* (2006.01)
*A01M 7/00* (2006.01)
*B05B 12/08* (2006.01)

(52) U.S. Cl.
CPC ............. *A01M 7/0003* (2013.01); *B05B 1/02* (2013.01); *B05B 12/082* (2013.01)

(58) Field of Classification Search
CPC ..... B05B 12/082; B05B 1/3026; B05B 17/06; A01M 7/001; A01M 7/0007; A01M 7/0003; B01L 3/0262
(Continued)

(56) References Cited

U.S. PATENT DOCUMENTS 3,341,087 A * 9/1967 Wormald .................. A61J 3/06
222/422
RE30,932 E * 5/1982 Stone ...................... B06B 1/163
74/61
4,769,009 A * 9/1988 Dykstra .............. A61M 5/1456
128/DIG. 1
(Continued)

FOREIGN PATENT DOCUMENTS

CN    200980300    11/2007
CN    203164082    8/2013

OTHER PUBLICATIONS

Zhai et al., Design of droplet size measuring system of air-assisted spraying and experiment on its influencing factors, Transactions of the CSAE, 2012, 28(19): 33-38.

*Primary Examiner* — Arthur O Hall
*Assistant Examiner* — Tuongminh Pham
(74) *Attorney, Agent, or Firm* — IP & T Group LLP

(57) ABSTRACT

In a device for producing quantitative-diameter spray droplets of pesticide, a driving motor is controlled by a control center, the driving motor drives a lead screw, the lead screw drives a sliding device to achieve a designated accurate position on a guide track, and a piston moves slowly along with the sliding device to extrude chemicals in a droplet generator quantitatively, the chemicals extruded by the pis-
(Continued)

ton through the motion in a droplet cavity forms small single droplets through a guide pipe, the droplets with specific particle size are further generated by precisely controlling the extrusion amount of the chemicals, so that the device can be widely used for studies about diffusion of the droplets evaporation property of the single droplets and the like tested by water-sensitive paper, as well as tests of the properties of the pesticide, and further has broad application prospects.

6 Claims, 2 Drawing Sheets

(58) Field of Classification Search
USPC .......... 239/67–69, 319, 263.1, 263.3, 263.4; 422/501
See application file for complete search history.

(56) References Cited

U.S. PATENT DOCUMENTS

| | | | |
|---|---|---|---|
| 2001/0016358 A1* | 8/2001 | Osawa .................. | B01L 3/0217 436/180 |
| 2001/0036424 A1* | 11/2001 | Takahashi ............ | B01J 19/0046 422/504 |
| 2002/0106812 A1* | 8/2002 | Fisher .................. | B01L 3/0268 436/180 |
| 2005/0212846 A1* | 9/2005 | Shinkawa .............. | B41J 2/0451 347/19 |
| 2006/0029724 A1* | 2/2006 | Babiarz ............... | B05C 11/1034 427/64 |

* cited by examiner

DEVICE AND METHOD FOR PRODUCING QUANTITATIVE-DIAMETER SPRAY DROPLETS OF PESTICIDE

This application is a national stage application of PCT/CN2013/084161 filed on Sep. 25, 2013, which claims priority of Chinese patent application number 201310415264.9 filed on Sep. 12, 2013. The disclosure of each of the foregoing applications is incorporated herein by reference in its entirety.

TECHNICAL FIELD

The present disclosure relates to the technical field of agriculture and particularly relates to a device and a method for producing quantitative-diameter spray droplets of pesticide.

BACKGROUND ART

Chemical pesticides are widely welcomed by farmers in all countries as an effective means for pest control in plant growth. However, along with extensive use of the chemical pesticides, the consequent problems also increase, for example, soil compaction can reduce the fertility of soil to a certain extent, and bring resistance to increase of the production of grains; and for example, atmospheric and water pollution can cause damages to human beings and other animals. After years of studies and in combination with foreign technical results, it can be seen that drift deposition of pesticides becomes one of main sources of the above damages. At present, there is still no instrument capable of generating pesticide droplets with specific particle size, so that the studies about the diffusion of the pesticide droplets and the evaporation property of the single droplets have not been developed in the real sense and the agricultural production requirements are seriously affected.

Therefore, against the above deficiencies, the present disclosure provides a device and a method for producing quantitative-diameter spray droplets of pesticide.

SUMMARY OF INVENTION

Technical Problems to be Solved

The technical problems to be solved by the present disclosure are as follows: there is no instrument capable of generating pesticide droplets with specific particle size in the prior art, the studies about the diffusion of the pesticide droplets and the evaporation property of the single droplets have not been developed in the real sense and the agricultural production requirements are seriously affected.

Technical Solutions

In order to solve the above technical problems, the present disclosure provides a device for producing quantitative-diameter spray droplets of pesticide comprising a sliding device positioned on a track and capable of sliding along the track, one end of the sliding device is connected with one end of a piston, the other end of the sliding device is connected with a driving motor through a lead screw, the other end of the piston can move in a droplet generator along with the sliding of the sliding device and the droplets in the droplet generator are released by a guide pipe.

Further, the droplet generator is clamped on a support.

Further, a vibration unit for removing bubbles in the droplet generator is further arranged on the support.

Further, the vibration unit comprises art eccentric counterweight module and a buffer module connected with the eccentric counterweight module, the eccentric counterweight module rotates to generate high-frequency vibration, and the vibration is slowed down to the overflow frequency of the bubbles through the buffer module.

Further, the buffer module is made of rubber.

Further, the minimal propulsion precision of the piston is 0.2 mm, and the diameter of the droplets is 200 μm-750 μm.

Further, the device further comprises a control center and a driver, wherein the driver is used for receiving and obtaining instructions of the control center and controlling the driving motor to operate according to the instructions.

Further, a mathematical model corresponding to the diameter of the droplets is $$0.2 NSn = \frac{4}{3}\alpha \Pi Dg^3,$$

wherein N is the advanced numerical distance of the piston, Sn is the cross-sectional area of the piston, α is the liquid correction coefficient and Dg is the diameter of the droplets.

The present disclosure further provides a method for producing quantitative-diameter spray droplets of pesticide, and the method comprises the following steps:

S1. injecting chemicals into a droplet generator;

S2. enabling a driving motor to work and drive a lead screw to rotate and further releasing one droplet in the droplet generator through a guide pipe;

S3. determining the diameter of the released droplet, and calculating the liquid correction coefficient through a mathematical model corresponding to the diameter of the droplets; and S4. reproducing the required diameter of the droplets.

Beneficial Effects

Above technical solutions of the present disclosure have the following advantages: the driving motor is controlled by the control center; the driving motor drives the lead screw to rotate; the lead screw drives the sliding device to a designated accurate position on the guide track; and the piston moves slowly along with the sliding device to extrude the chemicals in the droplet generator quantitatively. The chemicals extruded by the piston through the motion in a droplet cavity forms small single droplets through the guide pipe; the droplets with specific particle size are further generated by precisely controlling the extrusion amount of the chemicals, so that the device can be widely used for studies about diffusion property of the droplets, evaporation property of the single droplets and the like tested by water-sensitive paper, as well as tests of the properties of the pesticide, and further has broad application prospects.

In the Figures: 1: control center; 2: driver; 3: driving motor; 4: lead screw; 5: base; 6: sliding device; 7: track; 8: piston; 9: droplet generator; 10: support; 11 guide pipe; 12: calibrated scale, 13: buffer module; 14: eccentric counterweight module.

DETAILED DESCRIPTION OF THE EMBODIMENTS

The specific implementations of the present disclosure are further described in detail in combination with accompanying drawings and embodiments below. The following embodiments are used for describing the present disclosure rather than limiting the scope of the present disclosure.

Figure 1:
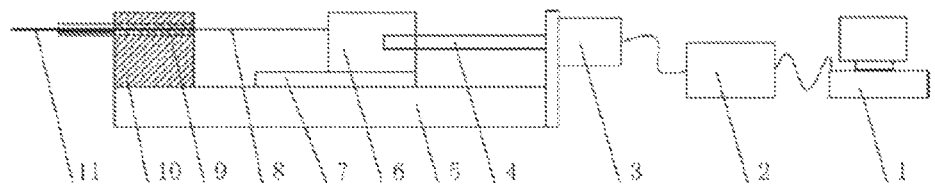
FIG. 1 is a structural schematic diagram a device for producing quantitative-diameter spray droplets of pesticide according to an embodiment of the present disclosure.
Figure 2:
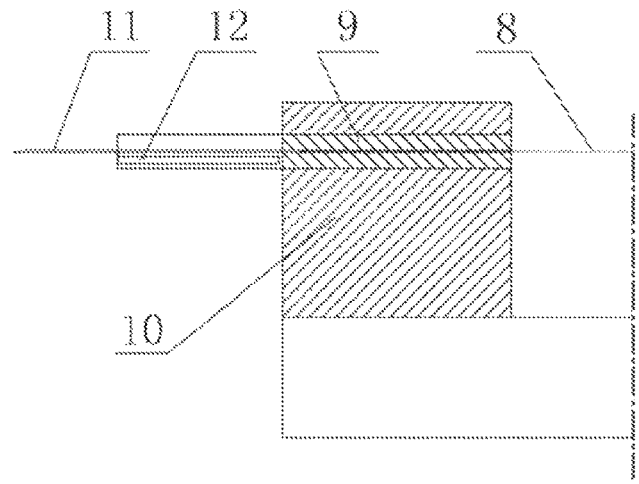
FIG. 2 is an enlarged view of the part of a droplet generator according to an embodiment of the present disclosure.

As shown in FIG. 1 and FIG. 2, an embodiment of the present disclosure provides a device for producing quantitative-diameter spray droplets of pesticide; and the device comprises a base 5, and a support 10 and a track 7 are arranged on the base 5.

A sliding device 6 is arranged on the track 7; the sliding device 6 is positioned on the track 7 and can slide along the track 7; one end of the sliding device 6 is connected with one end of a piston 8; the other end of the sliding device 6 is connected with a driving motor 3 through a lead screw 4; and the driving motor 3 is used for producing power to extrude the droplets. The lead screw 4 is a high-precision ball screw.

The piston 8 is shaped like a metal rod and used for moving in an inner cavity of a droplet generator 9 to extrude the droplets. The other end of the piston 8 can move in the droplet generator 9 along with the sliding of the sliding device 6. The droplets in the droplet generator 9 are released through a guide pipe 11; and the droplet generator 9 is clamped on the support 10. In consideration of the effects, preferably, the guide pipe 11 is communicated with the droplet generator 9; and the droplets formed by extrusion can flow out along the guide pipe 11, form circular droplets at the tail end of the guide pipe 11 and smoothly fall off the tail end of the guide pipe 11.

The driving motor 3 is connected with a control center 1 through a driver 2; and the driver 2 is used for receiving and obtaining instructions of the control center 1 and controlling the driving motor 3 to operate according to the instructions. Generally, the control center 1 is a computer. The computer is connected with the driver 2 through a 232 serial port and used for converting a numerical value of the diameter of the droplets, which is input by a user via the computer, to machine instructions of the device. The instructions are sent by the computer, the minimal propulsion precision of the piston 8 is 0.2 mm; and the single pesticide droplets from 200 μm to 750 μm can be automatically generated.

Figure 3:
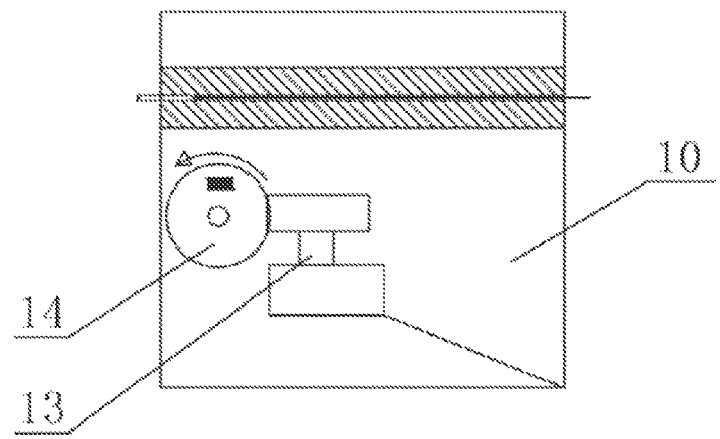
FIG. 3 is a schematic diagram of a vibration unit according to an embodiment of the present disclosure.

As shown in FIG. 3, a vibration unit for removing bubbles in the droplet generator 9 is further arranged on the support 10. The vibration unit comprises an eccentric counterweight module 14 and a buffer module 13 connected with the eccentric counterweight module 14. The eccentric counterweight module 14 rotates to produce high-frequency vibration; and the vibration is slowed down to the overflow frequency of the bubbles through the buffer module 13. In consideration of the cost, the buffer module 13 is made of rubber.

The vibration unit can ensure that one droplet released by the device does not contain bubbles, the droplets can be released one by one, and the experimental precision is further ensured. If bubbles are found to exist in chemicals in the operating process, the vibration unit can be used to realize an exhaust function, the bubbles in the droplet generator can be automatically removed by extrusion and vibration, and the bubbles contained in the droplets can be prevented from affecting the experimental precision.

A mathematical model corresponding to the diameter of the droplets is $$0.2 NSn = \frac{4}{3}\alpha \Pi Dg^3,$$

wherein N is the advanced numerical distance of the piston, Sn is the cross-sectional area of the piston, α is the liquid correction coefficient and α is the ratio of the diameter of the released droplets to the actually measured diameter of the droplets.

After a user sets the size and the number of the droplets, the computer can send these parameters to the driver through the serial port, and the driver further completes the next two steps, wherein the first step is that the volume of the droplets, which corresponds to the diameter of the droplets, is automatically calculated; and the second step is that the volume is converted to the extrusion distance required for producing the droplets by the droplet generator. The instructions are generated after calculation, and the instructions are sent to the driving motor. The driving motor rotates to drive the sliding device to move on the track. According to the instructions of the driver, the sliding device drives the piston to be slowly inserted into the droplet generator, and the insertion distance is precisely controlled.

The piston of a probe needs to advance 1 mm to generate the droplets of 200 μm; and generally, the minimal advancing precision of the piston is 0.2 mm.

Preferably, a calibrated scale 12 is further arranged on the droplet generator 9, the volume of movement of the chemicals, whether the bubbles exist or not and other problems can be observed very conveniently through scale marks on the calibrated scale 12, and if the bubbles exist, the bubbles can be automatically removed through the vibration unit, and the bubbles contained in the droplets can be prevented from affecting the experimental precision.

Figure 4:
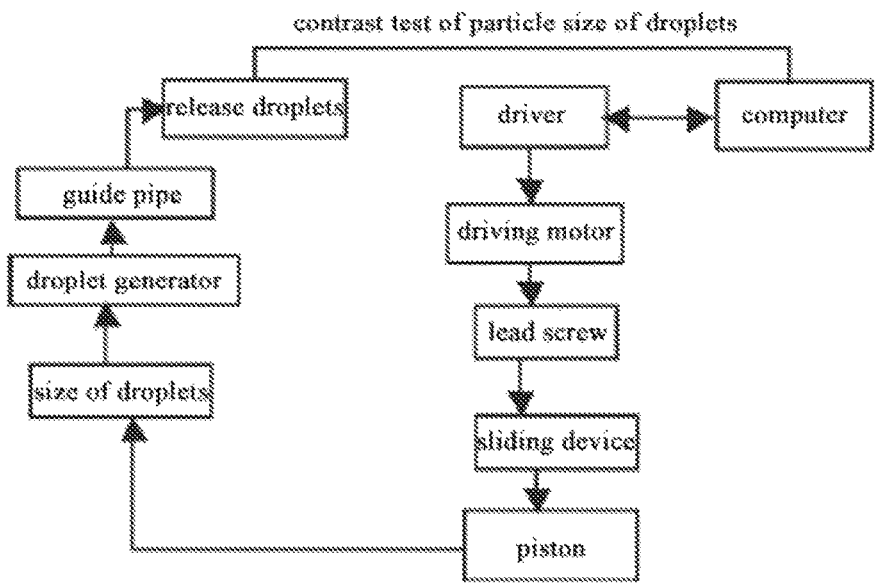
FIG. 4 is a schematic diagram of principle according to the embodiment of the present disclosure.

As shown in FIG. 4, the principle of the device for producing the quantitative-diameter spray droplets of the pesticide of the present disclosure is as follows:

The computer sends the parameters set by the user to the driver. After the driver obtains the transmission instructions, the driving motor is controlled to operate, the driving motor drives the lead screw; the sliding device is driven through the lead screw; the sliding device performs horizontal motion on the guide track; the piston is driven to perform piston extrusion motion in the droplet generator; the size of the droplets generated by extrusion corresponds to a certain extrusion space; and the mathematical model corresponding to the parameters has been described above and will not be described here in detail. The contrast test of the particle size of the droplets is measured by a laser sensor; and the numerical value of the correction coefficient α is obtained by the contrast test.

For example, one standard droplet with the diameter of 200 μm is released; and the particle size is measured through the laser sensor. For example, the particle size is 208 μm, then the value of the correction efficient α is calculated, α=200/208; and then the calculated correction coefficient α is input into the computer. The required particle size and the number of the droplets are set, and then the required accurate standard droplets can be produced.

Figure 5:
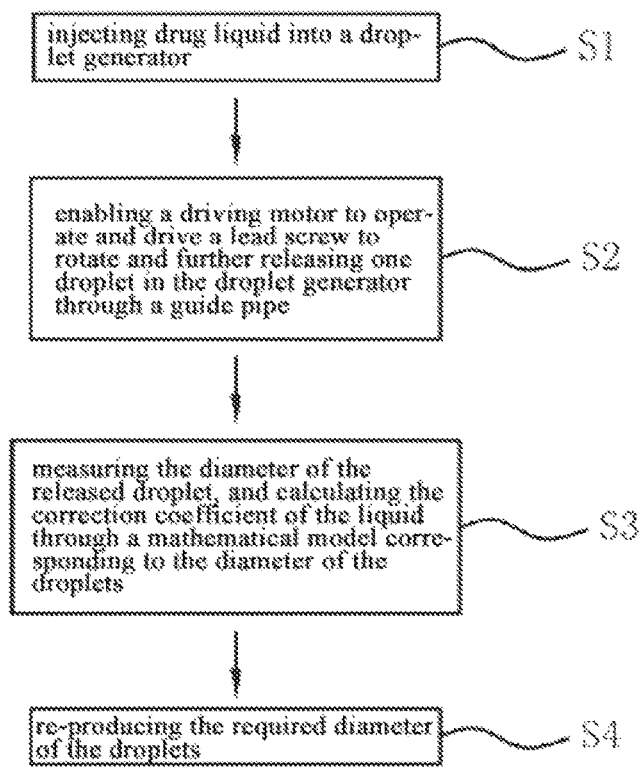
FIG. 5 is a flow diagram of a method for producing quantitative-diameter spray droplets of pesticide according to an embodiment of the present disclosure.

As shown in FIG. 5, the present disclosure further provides a method for producing quantitative-diameter spray droplets of pesticide, and the method comprises the following steps:

S1. injecting chemicals into a droplet generator;

S2. enabling a driving motor to operate and drive a lead screw to rotate and further releasing one droplet in the droplet generator through a guide pipe;

S3. measuring the diameter of the released droplet, and calculating the liquid correction coefficient through a mathematical model corresponding to the diameter of the droplets; and S4. re-producing the required diameter of the droplets.

In summary, the driving motor is controlled by the control center. The driving motor drives the lead screw; the lead screw drives the sliding device to a designated accurate position on the guide track; and the piston moves slowly along with the sliding device to extrude the chemicals in the droplet generator quantitatively. The chemicals extruded by the piston through the motion in a droplet cavity forms the small single droplets through the guide pipe. The droplets with the specific particle size are further generated by precisely controlling the extrusion amount of the chemicals, so that the device can be widely used for studies about diffusion property of the droplets, evaporation property of the single droplets and the like tested by water-sensitive paper, as well as tests of the properties of the pesticide, and further has broad application prospects.

The embodiments above are only preferred embodiments of the present disclosure. It should be noted that those skilled in the art can make a variety of improvements and variations without departing from the technical principle of the present disclosure, and the improvements and variations should also be considered to be within the protection scope of the present disclosure.

What is claimed is:

1. A device for producing quantitative-diameter spray droplets of pesticide, comprising a slider configured to slide along a track, wherein the slider is positioned on the track, one end of the slider is connected with one end of a piston, the other end of the slider is connected to a first end of a lead screw and a second end of the lead screw is connected to a driving motor, the other end of the piston can move in a droplet generator along with the sliding of the slider and the droplets in the droplet generator are released by a guide pipe, wherein a calibrated scale configured to determine whether bubbles exist in the droplet generator, and a first side of the calibrated scale is positioned adjacent to the droplet generator, wherein the guide pipe is positioned adjacent to a second side of the calibrated scale, wherein the guide pipe, the calibrated scale, the piston, the slider, the lead screw and the driving motor are all on a same first plane, wherein the track is arranged on a base which is positioned under the guide pipe, the calibrated scale, the piston, the slider, the lead screw and the driving motor and on a second plane which is parallel to the first plane, wherein a vibrator for removing bubbles in the droplet generator is further arranged on a support, and wherein a minimal propulsion precision of the piston is 0.2 mm, and the diameter of the droplets is 200 μm-750 μm.

2. The device for producing the quantitative diameter spray droplets of the pesticide according to claim 1, characterized in that the droplet generator is clamped on the support.

3. The device for producing the quantitative-diameter spray droplets of the pesticide according to claim 1, characterized in that the vibrator comprises an eccentric counterweight module and a buffer module connected with the eccentric counterweight module, the eccentric counterweight module rotates to generate high-frequency vibration, and the vibration is slowed down to an overflow frequency of the bubbles through the buffer module.

4. The device for producing the quantitative-diameter spray droplets of the pesticide according to claim 3, characterized in that the buffer module is made of rubber.

5. The device for producing the quantitative-diameter spray droplets of the pesticide according to claim 1, further comprising a control center and a driver, wherein the driver is used for receiving and obtaining instructions from the control center and controlling the driving motor to operate according to the instructions.

6. The device for producing the quantitative-diameter spray droplets of the pesticide according to claim 5, wherein the instructions received by the driver, include controlling the driving motor to adjust the size of the droplets based on a mathematical model corresponding to a diameter of the droplets is $0.2NSn=4/3\ \alpha\Pi Dg^3$, wherein N is an advanced numerical distance of the piston, Sn is a cross-sectional area of the piston, a is a liquid correction coefficient and Dg is the diameter of the droplets.

* * * * *

UNITED STATES PATENT AND TRADEMARK OFFICE
CERTIFICATE OF CORRECTION

PATENT NO. : 9,907,301 B2
APPLICATION NO. : 14/387154
DATED : March 6, 2018
INVENTOR(S) : Xiu Wang et al.

Page 1 of 1

It is certified that error appears in the above-identified patent and that said Letters Patent is hereby corrected as shown below:

Change the Foreign Application Priority Data section as follows:
(30) Foreign Application Priority Data
Sep. 12, 2013   (CN) ................2013 1 0415264.9

Signed and Sealed this
Seventeenth Day of April, 2018

Andrei Iancu
*Director of the United States Patent and Trademark Office*